May 6, 1969  E. D. PROCTOR  3,442,447
FLUID SIGNAL CODE CONVERTER
Filed March 6, 1967  Sheet 1 of 4

INVENTOR
EDWARD D. PROCTOR

BY *Hurvitz, Rose & Greene*

ATTORNEYS

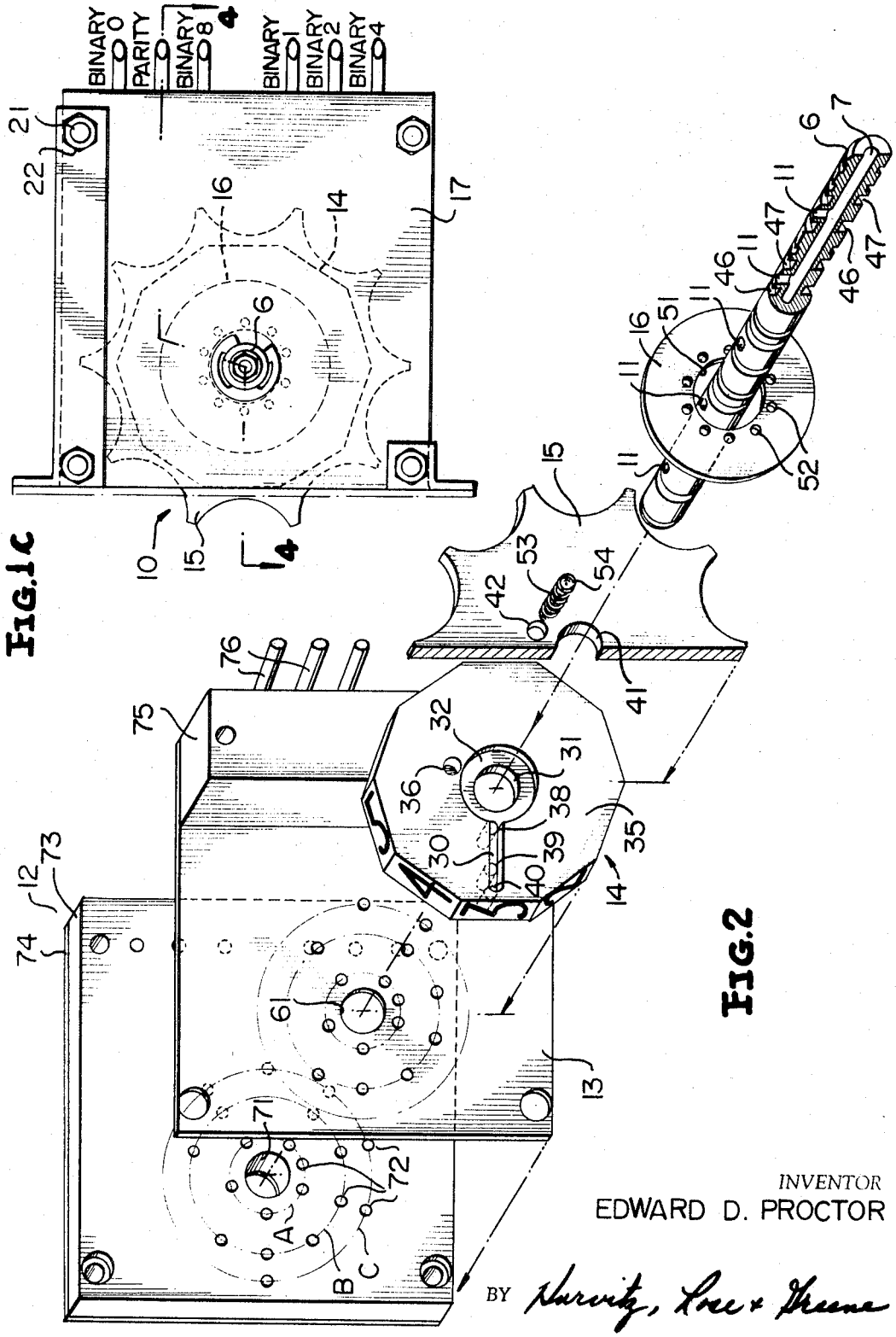

May 6, 1969

E. D. PROCTOR 3,442,447

FLUID SIGNAL CODE CONVERTER

Filed March 6, 1967

INVENTOR
EDWARD D. PROCTOR

BY *Hurvitz, Rose & Greene*

ATTORNEYS

May 6, 1969 E. D. PROCTOR 3,442,447
FLUID SIGNAL CODE CONVERTER
Filed March 6, 1967 Sheet 4 of 4

INVENTOR
EDWARD D. PROCTOR

BY *Hurvitz, Rose & Greene*

ATTORNEYS

United States Patent Office 3,442,447
Patented May 6, 1969

3,442,447
FLUID SIGNAL CODE CONVERTER
Edward D. Proctor, Riverdale, Md., assignor to Bowles Engineering Corporation, Silver Spring, Md., a corporation of Maryland
Filed Mar. 6, 1967, Ser. No. 620,818
Int. Cl. G06d 7/00; G06m 1/12
U.S. Cl. 235—201                                21 Claims

ABSTRACT OF THE DISCLOSURE

A device for providing coded fluid signals in response to selectable settings of members which settings are calibrated in a code that differs from the signal code. The members are rotatably mounted on a shaft and are adapted to conduct pressurized fluid to different combinations of inlet ports of respective fluid coding circuits as a function of the position of the members relative to the coding circuits. The coding circuits provide coded fluid output signals which are a function of the receipt of fluid at the various inlet ports and thus serve as a coded representation of the positions of the members.

BACKGROUND OF THE INVENTION

The present invention relates to code converters, and more particularly to an apparatus for generating fluid signals arranged in a first numerical code in response to the settings of movable members whose positions are calibrated in a second numerical code.

In numerous fluid signal-operated systems there is a requirement that certain fluid input signals be operator-initiated and be in the form of a particular numerical code. For example, in case of a fluid control system for accurately positioning machine tools, it may be necessary to generate binary or binary coded decimal signals in order to initiate tool positioning operations with a minimum of circuit complexity and a high degree of accuracy. The operator normally adjusts certain controls to achieve the desired tool position. Generally, operators of systems such as these will have an exceedingly greater familiarity with the decimal number system than any other numerical code, so that the system controls are calibrated in the decimal system. Problems arise converting the decimal control setting to signals acceptable in a machine control, such as binary or binary-coded-decimal signals. Prior art fluid systems have been marked by complexity resulting from the necessity of converting from operator to machine language in such devices as punched tape converters, electrical to fluid transducers, etc.

SUMMARY OF THE INVENTION

The invention described herein greatly simplifies the conversion operations described above by providing one or more calibrated dials rotatably mounted on a shaft and having fluid conducting channels formed therein, said channels remaining in fluid communication with a source of pressurized fluid. The fluid conducting channels are thus able to conduct the pressurized fluid to different angular and radial locations about the shaft as the dials are rotated. Fluid coding circuits having plural input ports for receiving fluid from the dials in their various positions provide the required coded fluid output signals from a plurality of outlet ports, this function being effected by a fluid passage matrix interconnecting the inlet and outlet ports of the coding unit in accorrance with the desired code.

While the simplicity of the code conversion made possible by means of this invention is particularly advantageous to a manually operated apparatus, it will become evident from the description below that the principles of this invention may be employed to reduce the complexity of code conversion in automatically operated system.

It is therefore an object of this invention to provide a device for converting the positional settings of a controlled member to one or more coded fluid signals.

It is another object of this invention to provide an apparatus for converting position settings of a dial or similar device, calibrated in a first numerical code, to one or more fluid signals conforming to a second numerical code.

It is another object of this invention to provide an apparatus for generating fluid signals in a first coded form in response to the position of fluid conducting control members calibrated in a different coded form.

It is still another object of this invention to provide an apparatus having decimally calibrated rotatably positioned dials and associated fluid signal coding circuits for generating binary coded decimal type coded fluid signals representative of the positions of said dials.

Yet another object of this invention is the provision of an apparatus in which a decimally calibrated dial member cooperates with a manually operable thumbwheel to conduct pressurized fluid to a coding circuit whereby binary coded fluid signals are generated in response to the position of the thumbwheel.

The above and still further objects, features and advantages of the present invention will become apparent upon considerations of the following detailed description of the spectific embodiments thereof, especially when taken in conjunction with the accompanying drawings, wherein:

FIGURES 1a, 1b and 1c are front, top and side plan views respectively of an embodiment of this invention;

FIGURE 2 is an exploded view of a single section of the embodiment of FIGURES 1a–c;

Figure 1A:
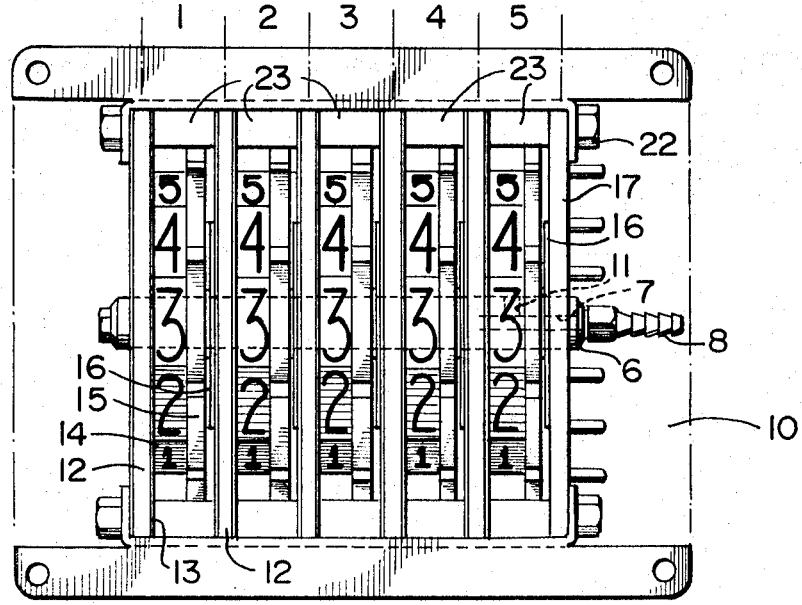
Figure 1B:
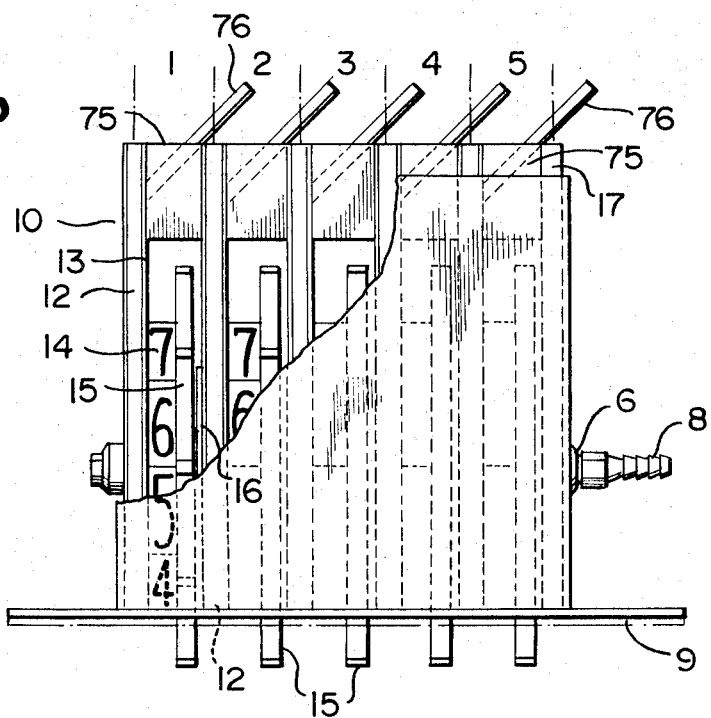

Referring now specifically to FIGURE 1a, 1b and 1c of the accompanying drawings, there is illustrated a first embodiment of the converter assembly 10 constructed in accordance with the principles of this invention and employing five individual and identical converter sections 1–5, respectively. The five converter sections are mounted on and sequentially arranged along the length of a common cylindrical shaft 6. A fitting 8 suitable for receiving pressurized fluid from a source (not illustrated) is provided at one end of shaft 6 and communicates with a passage 7 disposed internally of and along the longitudinal axis of the shaft. Passage 7 additionally communicates with a plurality of fluid ports 11 extending radially therefrom and spaced longitudinally along the shaft 6, there being one port 11 for each converter section 1–5. Ports 11 conduct the pressurized fluid necessary for operation to the respective converter sections. As will be understood from the alternative embodiments to be subsequently described, other means for supplying fluid to each converter section may be employed whereby passage 7 and ports 11 may be dispensed with.

Each converter section 1–5 comprises the following individual elements mounted in sequence from left to right along shaft 6 as viewed in FIGURE 1a; a fluid coding circuit assembly 12 in the shape of a rectangular plate; a thin rectangular gasket member 13; a dial member 14 in the shape of a decagonal plate; a ten-toothed thumbwheel disk 16; and a detent disk 16 having the shape of a circular plate. Detent disk 16 is mounted on a left wall of the coding circuit assembly 12 of the next adjacent converter section (i.e., detent disk 16 for converter section 1 is mounted on the left wall of the coding circuit assembly 12 in converter section 2). In the case of converter section 5 the detent disk 16 is mounted on the left surface of a specially provided end wall 17 for assembly 10, wall 17 being in the form of a rectangular plate of substantially the same dimensions as coding circuit assemblies 12. Individual converter sections 1–4 are thus bounded by adjacent coding circuit assemblies 12, and section 5 is bounded by its coding circuit assembly and end wall 17. Each of the converter stage elements above described is mounted on shaft 6, the coding circuits 12 and end plate 17 being fixedly mounted thereon and the dial member 14 and thumbwheel disk 15 being rotatably mounted thereon. The individaul coding circuit assemblies 12 and the end plate 17 are provided with mounting holes at each of their four corners, the holes being respectively aligned to receive four respective tie rods 21 which are threaded at both ends to be engaged by four respective pairs of nuts 22. Hollow cylindrical spacers 23 are mounted between adjacent coding circuit assemblies (and in the case of converter section 5 between the coding circuit 12 of section 5 and the end wall 17) on both of the front tie rods 21. As will be understood from the subsequent description, the space between adjacent coding circuit assemblies along the two rearmost tie rods 21 is occupied by respective fluid connector units 75 which conduct the coded fluid output signals from the respective coding circuit assemblies 12.

The structural and functional relationships between individual elements in the individual converter sections will be best understood with reference to FIGURE 2, an exploded perspective view of a single converter section. Dial member 14, a decagonal disk having its ten edge surfaces respectively numbered from 0 through 9, is rotatably mounted on shaft 6 through a centrally located hole 31 having a diameter substantially equal to the diameter of shaft 6. One of the flat surfaces 35 of the dial member 14 has a circular recess or channel 32 formed therein concentrically about hole 31. Channel 32 has a thin radial channel 30 extending therefrom, the channels 30 and 32 extending a depth approximately one-quarter of the longitudinal dimension of member 14, although this dimension is not critical. Disposed along channel 30 are three cylindrical passages 38, 39 and 40 each having a longitudinal axis parallel to that of hole 31 and that of shaft 6. Passages 38, 39 and 40 are located at increasing radial distances from the center of hole 31. In the same surface 35 of dial member 14 in which channel 32 is formed, a cylindrical hole 36 is formed to a depth equivalent to approximately three quarters the longitudinal dimension of member 14. Cylindrical hole 36 is located at a distance from the center of hole 31 which is slightly greater than the radius of circular channel 32, and has a diameter substantially smaller than that of hole 31. As will be subsequently described, a detent spring and ball mechanism is fitted in hole 36 and cooperates with detent disk 16 to determine the angular position of the dial member 14 as it is rotated about shaft 6.

Dial member 14 is positioned on shaft 6 such that channel 32 communicates with the fluid port 11 associated with its respective converter section. In this manner fluid from passage 7 is conducted through channels 32 and 30 to holes 38, 39 and 40 which as will subsequently be described communicate with various input ports in coding circuit 12 so as to produce the required coded output signal.

Thumbwheel member 15 is a ten-toothed disk having ten angularly spaced and radially extending tooth edges with approximately sized thumb index recesses therebetween. The thumbwheel is rotatably mounted on shaft 6 through centrally disposed cylindrical hole 41 of substantially the same diameter as hole 31 in dial member 14. The surface 35 of dial member 14 is secured to the contiguous surface of thumbwheel 15 by means of epoxy or similar adhesive so that the dial and thumbwheel rotate together about shaft 6 and the surface of thumbwheel 15 adjacent member 14 serves to seal the channels 30 and 32. Although not to be considered a requirement of this inveniton the thumbwheel is illustrated in FIGURE 1a as being aligned with dial member 14 such that the ten thumb index recesses are positioned adjacent a respective numbered surface on the dial 14. A rotational force applied by the operator at the appropriate index recess therefore enables the rotation of dial member 14 to the desired position. In the embodiment described the appropriate position is that in which the desired dial marking is aligned to be viewed at the front of the assembly, as for example the number "three" in FIGURE 1a. A cover plate such as element 9 illustrated in FIGURES 1b and 1c may be positioned over the front assembly 10 such that only the desired dial numbers may be viewed through a cut-out portion of the plate.

Figure 4:
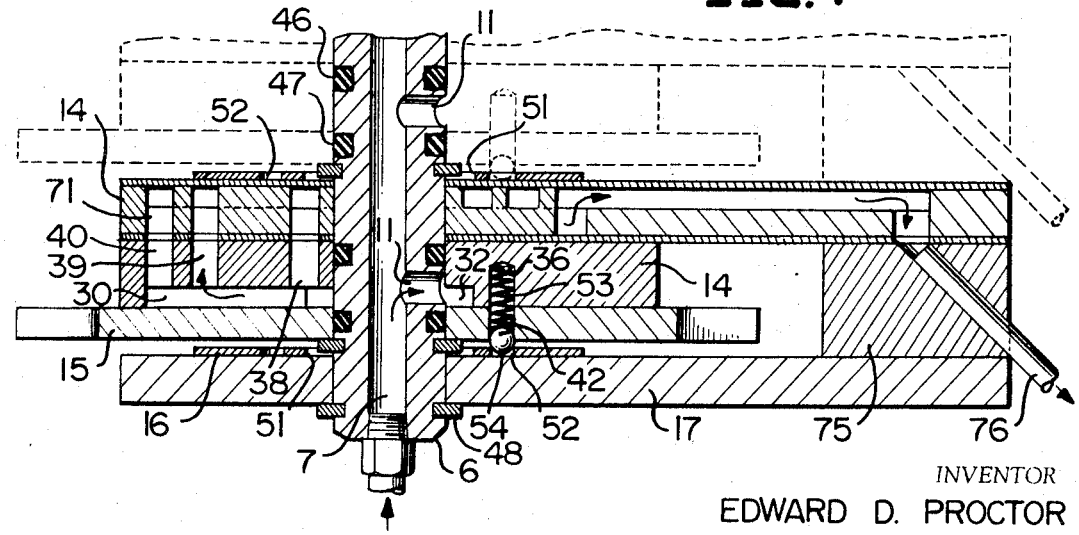
FIGURE 4 is a sectional view taken along lines 4—4 in FIGURE 1c.

Thumbwheel 15 is provided with an additional cylindrical hole 42 extending therethrough in the same direction as hole 41, hole 42 being in precise alignment with hole 36 in dial member 14 so as to permit the detent spring and ball to extend therethrough and contact the appropriate holes in detent disk 16 to be described subsequently. When dial member 14 and thumbwheel 15 are mounted on the shaft 6 they are positioned so as to overlap port 11 in the manner previously described, and in addition the dial member 14 and thumbwheel 15 are positioned so as to overlap respective recessed portions 46 and 47 in the shaft 6 in which suitable O-rings may be positioned to minimize fluid leakage along the surfaces surrounding holes 31 or 41. The relative positions of the dial member 14 and thumbwheel 15 with respect to shaft 6 is best illustrated in FIGURE 4.

Figure 3:
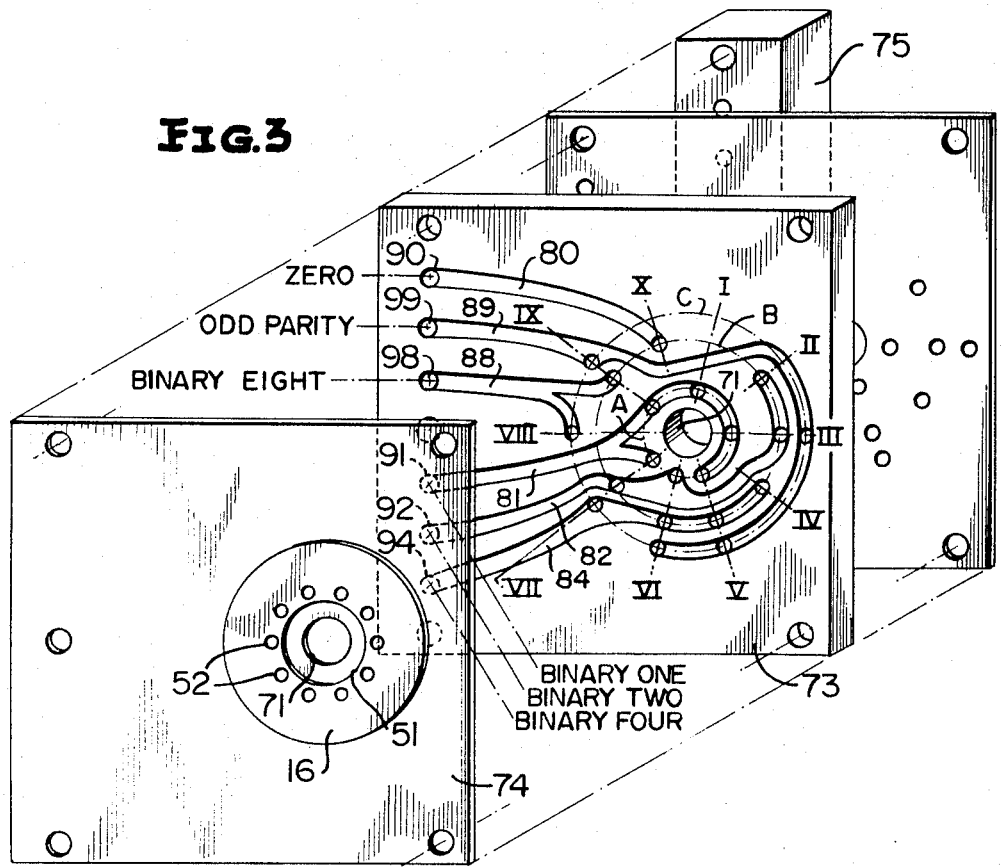
FIGURE 3 is an exploded view of the coding circuit assembly employed in the embodiment of FIGURES 1a–c.

As described above, the detent disk 16 for each converter section is mounted on the wall of the coding circuit comprising a part of an adjacent converter section (as best illustrated in FIGURE 3), such circuit of the adjacent unit not being illustrated in FIGURE 2 in order to clarify the illustrations. Detent disk 16 is preferably a thin metal disk, circular in shape and having a centrally positioned circular hole 51 formed therein, hole 51 having a diameter substantially larger than the diameter of holes 31 and 41. Disk 16 is symmetrically disposed about the longitudinal axis of shaft 6 which extends through hole 51. Ten regularly spaced circular holes 52 extend through disk 16 and form a circular path about hole 51, the radius of this path being equal to the radial displacements of holes 36 and 42 from the centers of respective holes 31 and 41. Holes 52 thus are alignable with holes 36 and 42 for various rotational positions of dial member 14 and thumbwheel 15, there being a different hole 52 so aligned for each of the ten positions of the dial member. As best illustrated in FIGURE 4, a detent spring 53 engages a detent ball 54 at one end thereof, the spring being of the coil type having a radius sufficient to permit it to fit snugly into holes 36 and 42. The end of the spring 53 which holds ball 54 extends towards detent disk 16, the ball 54 being of such diameter as to permit a portion thereof to engage selective ones of holes 52. This detent arrangement enables a discrete positioning of the dial member at each of its ten positions. The reason for the detent arrangement is to assure that there is a proper alignment of holes 38, 39 and 40 with appropriate input ports in the coding circuit assembly 12 for each of the discrete positions of the dial member assembly.

Gasket 13 is positioned between adjacent walls or surfaces of dial member 14 and fluid coding circuit 12 and is made up of a thin sheet of Teflon or similar material having a plurality of holes therein which correspond in size and location to various fluid input ports and output ports to be subsequently described as associated with the fluid coding circuit 12. In addition, a hole 61 is provided in gasket 13 having the same diameter as holes 31 and 41 and through which shaft 6 extends. Gasket 13 serves to prevent fluid leakage between dial member 14 and coding circuit 12.

The coding circuit assembly 12 is positioned immediately adjacent gasket 13 and is mounted on shaft 6 which extends through a circular hole 71 formed in assembly 12, said hole being of substantially the same size as holes 31 and 41 in dial member 14 and thumbwheel 15 respectively. The coding circuit assembly 12 as best illustrated in FIGURES 2 and 3 comprises a rectangular metal or plastic plate 73 positioned immediately adjacent gasket 13 and a similar rectangular cover plate 74 secured by means of epoxy or similar adhesive or by bolts, etc. to the surface of plate 73 remote from gasket 13. Circular hole 71 described above extends through both the plate 73 and cover plate 74. The surface of cover plate 74 which is remote from plate 73 has detent disk 16 secured thereto.

A plurality of fluid inlet ports, generally referenced by the numeral 72, extend through plate 73 and are of substantially the same size and shape as passages 38, 39 and 40 in dial member 14. The inlet ports 72 are arranged in three circular paths A, B, and C about the center of hole 71, and are also selectively arranged in ten columns, I–X extending radially from hole 71, the angular spacing between adjacent columns being equal and thus being nominally 36°. The three circular paths A, B, and C are respectively disposed at radial lengths from the center of shaft 6 equal to the distance of a respective one of passages 38, 39 and 40 from the center of the shaft. In addition, the ten radial columns of ports I–X are oriented such that the holes 38, 39 and 40 are centered on the ten radial columns for each of the ten discrete positions of dial member 14 as defined by the ten discrete detent disk position holes 52. Since the various holes in gasket 13 are arranged to coincide with the inlet ports in the plate 73, it is apparent from the above description that for various positions of dial member 14, passages 38, 39, and 40 communicate with respective inlet ports in plate 73, it being understood that the particular code employed, as will subsequently be described, determines whether or not an inlet port is provided at a given intersection of a radial column and a circular path A, B or C.

Six channels 80, 81, 82, 84, 88, and 89 are milled or otherwise formed in the surface of plate 73 remote from gasket 13. Each of the inlet ports 72 communicate with one of the six channels, the determinative factor as to which inlet ports communicate with which channels being the particular code employed. Six outlet ports, 90, 91, 92, 94, 98, and 99 extend through plate 73 and communicate with respective ones of channels 80, 81, 82, 84, 88, and 89. The outlet ports are for instance arranged in a vertical (as with reference to FIGURE 1a) column at the rear of plate 73. Cover plate 74, when secured to plate 73 as described above, provides a cover for the various channels so as to create sealed fluid conducting paths between various ones of the inlet ports 72 and the outlet ports. By means of these paths, pressurized fluid may be conducted from holes 38, 39 and 40 in dial member 14 to various ones of outlet ports 90, 91, 92, 94, 98 and 99 in the coding circuit assembly 12 as a function of the rotational position of dial member 14 and of the code determined by the passage interconnecting between inlet ports 72 and the outlet ports.

In the embodiment of this invention illustrated in the drawings, the decimally calibrated positions of each dial member 14 are converted to a modified binary-type code. Any combination of two or more converter stages make up a modified binary-coded decimal (BCD) code, modified in the sense that a zero bit and odd parity bit are provided in addition to the standard one, two, four and eight bits of each decade in the BCD format. Specifically, zero outlet port 90 is intended to provide a fluid pressure signal (binary one) whenever dial member 14 is in the zero position, and odd-parity outlet port 99 is intended to provide a fluid pressure signal (binary one) as required to maintain odd-parity, that is whenever an even number of outlet ports 91, 92, 94, and 98 have fluid pressure signals egressing therefrom. Outlet ports 91, 92, 94, and 98 of course are intended to provide combinations of weighted fluid pressure signals (binary ones) as a function of the position of decimally calibrated dial member 14 and the well-known BCD format. It is to be understood that the zero and parity outlet ports are optional and may be dispensed with.

In order to provide the required signals at the various outlet ports, the channels 80, 81, 82, 84, 88, and 89 interconnect appropriate inlet ports 72 to respective outlet ports 90, 91, 92, 94, 98 and 99. Specifically, and referring to specific inlet ports by their positions at intersections of paths A–C and columns I–X (such as A–I, C–IX, etc.), channel 80 interconnects inlet port B–X to outlet port 90. It is noted that there are no inlet ports provided at locations A–X and C–X so that only passage 39 of dial member 14 communicates with an inlet port (B–X) when the radial channel 30 is aligned with column X, that is when dial member 14 is in its 0 position. Channel 81 on the other hand interconnects inlet ports A–I, A–III, A–V, A–VII, A–IX and outlet port 91. Thus, in each of positions 1, 3, 5, 7 and 9 of dial member 14, passage 38 will conduct pressurized fluid to outlet port 91 thus providing a binary one at each odd position of the wheel 14. Channel 82 interconnects inlet ports A–VI, B–II, B–III, B–VII and outlet port 92, channel 84 interconnects inlet ports B–IV, B–V, B–VI, C–VII and outlet port 94, channel 88 interconnects inlet ports B–IX, C–VIII, and outlet port 98, and channel 89 interconnects inlet ports C–III, C–V, C–VI, C–IX and outlet port 99.

In operation with the wheel 14 in "0" position, the hole B–X and thus port 90 receives fluid indicating 0. In position "1" hole A–I and thus port 91 receives fluid. In position "2" hole B–II and thus port 92 receive fluid. In position "3" holes A–III, B–III and C–III and thus ports 91, 92 and 99 receive fluid. Ports 91 and 92 represent binary 1 and 2 respectively and a count of three is indicated. Since two outlet ports are energized the parity bit is added to maintain odd parity. In position "4" hole B–IV and thus port 94 receive fluid to indicate binary 4. In position "5" ports A–V, B–V and C–V and outlet ports 91, 94 and 99 receive fluid, providing a binary 5 and parity bit. The remainder of operation is repetitious noting only that holes C–VIII and B–IX are connected to port 98, the binary 8 port.

The outlet ports formed in plate 73 communicate, via appropriately aligned holes in gasket 13, with respective output passages 76 in connector unit 75. Connector unit 75 is in the shape of a rectangular box having six spaced, obliquely directed fluid passages 76 formed therein from one of its rectangular surfaces to a corner remote from such surface. Connector unit 75 is positioned so that said one rectangular surface is flush against gasket 13 with each of the passages 76 aligned with a respective outlet port in plate 73 and with passages 76 extending obliquely toward the rear of assembly 10. As illustrated, passages 76 may terminate in tubular extensions (clippard fittings) beyond the confines of connector unit 75. A pair of holes are provided through connector unit 75, such holes being respectively aligned with the two rearmost tie rods 21 which serve to fixedly position unit 75 between adjacent coding circuit assemblies 12 in assembly 10.

It may now be appreciated that converter sections 1–5 in assembly 10 provide a simple and inexpensive means for permitting an operator to initiate generation of a modified BCD signal by positioning the various dial members 14 as desired in accordance with the decimal calibrations on the dial edges. Taking a specific example to illustrate the operation of assembly 10, assume that it is necessary to generate fluid signals corresponding to the BCD equivalent of the decimal number 12,345. The operation would merely rotate the thrumbwheels 15 of the various converter sections 1–5 such that the edge marked "1" on the dial member 14 of converter section 1 was facing the front of the assembly. Similarly the dial members 14 of converter sections 2, 3, 4, and 5 would be rotated to expose their respective edges marked "2," "3," "4" and "5" to the front of assembly 10. Pressurized fluid provided to passage 7 in shaft 6 by a fluid pressure source (not illustrated) is conducted via the five radial ports 11 to channels 32 and 30 in the dial members 14 of respective converter sections 1–5. At converter section 1, the dial member 14 is in position "1" so that fluid is conducted from channel 30 via passage 38 to inlet port A–1 in coding circuit assembly 12. This in turn provides a binary one signal at outlet port 91 via channel 81. In the "1" position of dial member 14, passages 39 and 40 do not communicate with inlet ports at the coding circuit 12 so that only outlet port 91 is provided with a binary one signal at converter section 1. At converter section 2, dial member 14 is in position "2," so that passage 39 conducts fluid to outlet port 92 via inlet port B–II and channel 82. At converter section 3, dial member 14 is in position "3" so that passage 38 conducts fluid to outlet port 91 via inlet port A–III and channel 81, and passage 39 conducts fluid to outlet port 92 via inlet port B–III and channel 82 and passage 40 conducts fluid to outlet port 99 via inlet port C–III and channel 89. At converter section 4 the dial member is in position "4" so that passage 39 conducts fluid to outlet port 94 via inlet port B–IV and channel 84. At converter section 5, dial member 14 is in position "5" so that passage 38 conducts fluid to outlet port 91 via inlet port A–V and channel 81, and passage 39 conducts fluid to outlet port 94 via inlet port B–V and channel 84, and passage 40 conducts fluid to outlet port 99 via inlet port C–V and channel 89.

Figure 5:
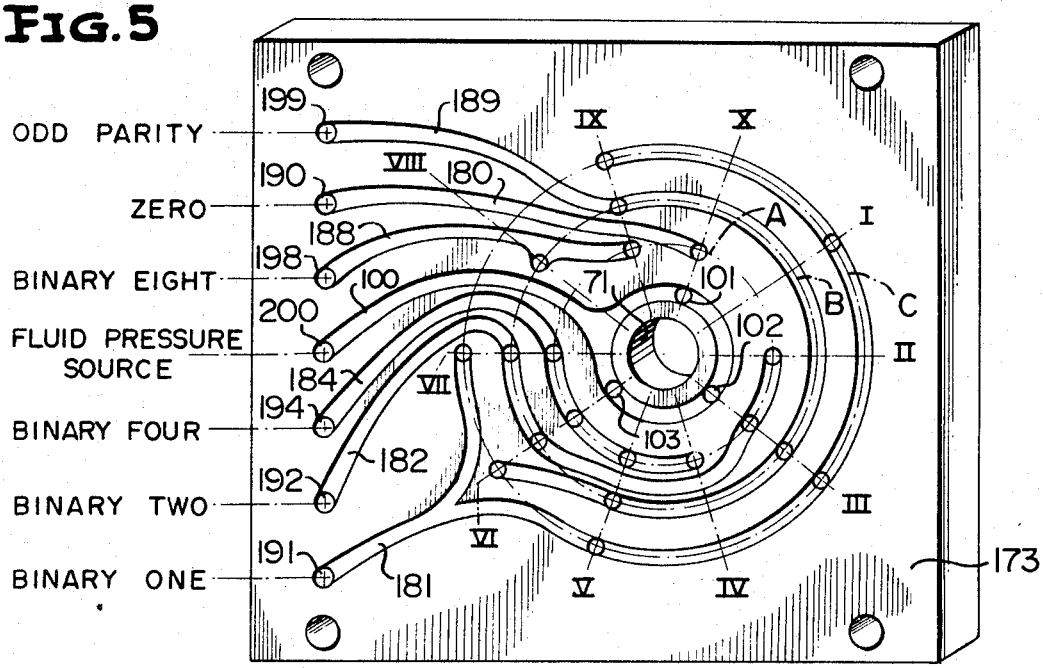
FIGURE 5 is a plan view as an alternative embodiment of a portion of the coding circuit illustrated in FIGURE 3.

It will be noted that the longitudinal passage 7 of shaft 6 acts as a restriction to fluid flow between the source (not illustrated) and the various converter sections 1–5. This may create a problem where the passage 7 is extended in order to accommodate a large number of converter sections, the problem comprising decreases in pressure at the various ports 11 along the length of shaft 6 as the distance of the respective ports 11 from the fluid source increases. In order to overcome this problem, the various converter sections may be provided with pressurized fluid from independent pressurized fluid sources or from a common pressurized fluid source connected to a manifold which distributes the pressurized fluid to the individual converter sections. This may be accomplished by modifying the coding circuit assembly 12 so that it is capable of receiving the pressurized fluid and distributing it to the various inlet ports 72 as a function of the position of dial member 14. In FIGURE 5 there is illustrated a plate 173 corresponding to plate 73 of FIGURE 3 but modified to receive pressurized fluid from a source (not illustrated). For ease of cross-reference, the elements appearing in FIGURE 5 are designated by similar reference characters to those characters associated with corresponding elements in FIGURE 3, there being a "1" pre-fixed to each such character in FIGURE 5.

The six outlet ports 190, 191, 192, 194, 198, and 199 on plate 173 are arranged to provide fluid output signals in a manner identical to that described for respective ports 90, 91, 92, 94, 98 and 99 above. A further port 200 is provided however, such being of the same size and shape as the outlet ports and being preferably, though not necessarily, located adjacent thereto. Port 200 serves as the fluid pressure inlet port for each converter section and is understood to be suitably connected to a passage (not illustrated), similar to passages 76 in connector unit 75, which passage is in turn connected to receive supply fluid from the supply manifold or from an individual source (not illustrated). Supply port 200 communicates with a channel 100 formed in the surface of plate 173 which is remote from dial member 14, channel 100 having a plurality of ports 101, 102, 103 formed therein and extending through the entire width of plate 173. It is to be noted that channel 100 is formed to a depth in plate 173 similar to that of channels 180, 181, 182, 184, 188, and 189 which communicate with respective outlet ports 190, 191, 192, 194, 198, and 199. In addition, ports 101, 102, and 103 are similar in size and shape to inlet ports 72 which are best illustrated in FIGURE 2. While only three ports are illustrated as communicating between channel 100 and the opposite surface of plate 173, it is to be understood that any number of such ports may be provided.

For the coding circuit embodiment illustrated in FIGURE 5 it is evident that a slight modification of dial member 14 is necessary, namely, changing the location of channels 30 and 32 from surface 35 to the opposite surface of said dial member. By means of this modification, source fluid provided at input port 200 is conducted via channel 100 and ports 101, 102, and 103 to channels 30 and 32 from which it is conducted to the various inlet ports 72 of the coding circuit. It will be noted that holes 38, 39 and 40 are not required in channel 32 for purposes of this embodiment of the invention, since pressurized fluid present in channel 32 is in direct communication with various ones of the fluid inlet ports 72 as a function of the position of dial member 14. As in the previously described embodiment, gasket 13 serves as a sealer to prevent fluid leakage between dial member 14 and coding circuit 12.

It will be noted that since holes 38, 39 and 40 are not required in channel 32 in the last described embodiment, the inlet ports 72 of coding circuit 12 need not be arranged in circular paths A, B, and C, although the circular path arrangement is illustrated in FIGURE 5 in order to facilitate cross-reference between embodiments. It will also be noted that the presence of channel 100 as part of the coding circuit necessitates a certain amount of re-positioning of inlet ports 72 from their original positions in the embodiment of FIGURE 3. Specifically, and with the inlet ports being designated in accordance with their position at the intersection of radial columns I–X and circular paths A, B, and C, the binary one outlet port 191 communicates via channel 181 with inlet ports C–I, C–III, C–V, C–VII and C–IX; the binary two outlet port 192 communicates via channel 182 with inlet ports A–II, A–III, B–VI and B–VII; the binary four outlet port 194 communicates via channel 184 with inlet ports A–IV, A–V, A–VI and A–VII; the binary eight inlet port 198 communicates via channel 188 with inlet ports B–VIII and A–IX; the zero outlet port 190 communicates via channel 180 with inlet port A–X; and the odd parity outlet port 199 communicates via channel 189 with inlet ports B–III, B–V, C–VI, and B–IX.

The operation of the coding circuit embodiment illustrated in FIGURE 5 is similar to the operation of the embodiment in FIGURE 3 and need not be described in detail. Suffice it to say that the rotational positions of dial member 14 determine the rotational positions of channel 32 so that pressurized fluid is conducted from input port 200 via channel 100, holes 101, 102, 103, channel 30 and channel 32 to appropriate inlet ports 72 as a function of the dial member position. The resultant output signals provided at outlet ports 190, 191, 102, 104, 198 and 199 provide an indication of the dial member position in a binary type code.

Utilization of the coding circuit of FIGURE 5 obviates the need for certain of the expedients employed in connection with the embodiment of FIGURES 3 and 4, such as gaskets 46 and 47 which were previously required to minimize fluid leakage along shaft 5, and such as the accurate positioning of the various converter sections 1–5 along the shaft 6 with respect to ports 11, the latter not being required in the modified coding circuit.

Figure 6:
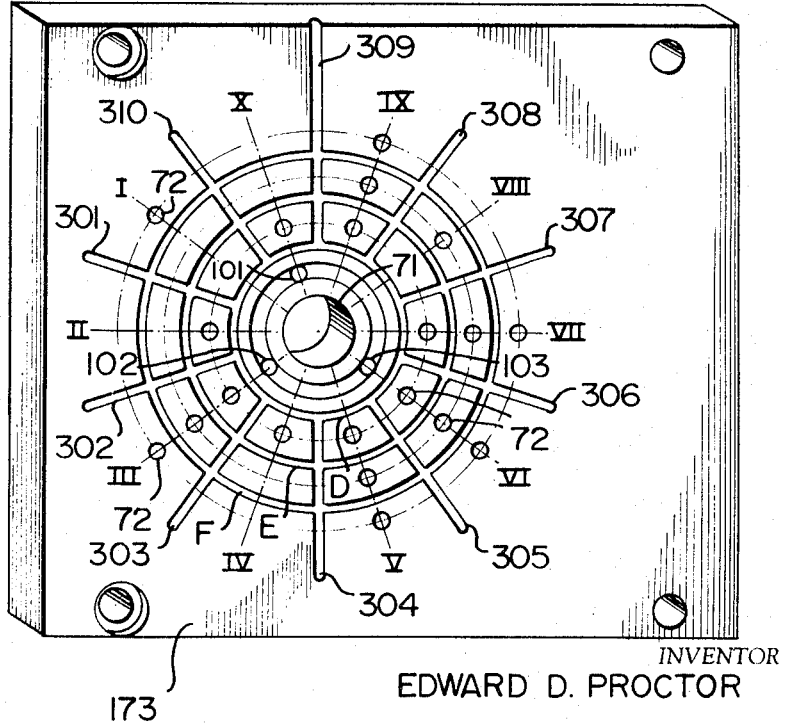
FIGURE 6 is a plan view of an alternative embodiment of a portion of the coding circuit illustrated in FIGURE 5.

FIGURE 6 illustrates a modification of the coding circuit embodiment of FIGURE 5, the concept employed therein being similarly adaptable to modify the coding circuit of FIGURE 3. The modification is designed to eliminate the problem of "cross-talk," which in the context of the device of FIGURE 6, is the problem where pressurized fluid leaks along the surface of the coding circuit assembly from an inlet port 72 at which fluid is intended to be delivered to one or more other inlet ports 72. Thus, if "cross-talk" were to exist, it could result in an output signal being developed which would erroneously indicate the position of dial member 14. To prevent such a situation, a plurality of vent channels communicating with ambient pressure are formed in plate 173 in the surface lying adjacent gasket 13 and dial member 14. Ten of these vent channels are arranged in ten radial columns 301–310 extending from hole 71, one each positioned between adjacent ones of inlet port columns I–X. Additional vent channels are arranged in three circular paths D, E, and F concentrically positioned about hole 71 so that channel D is positioned intermediate pressure supply ports 101, 102, 103 and inlet port path A, channel E is positioned intermediate inlet port paths A and B, and channel F is positioned intermediate inlet port paths B and C. The various circular vent channels intersect with the radial vent channels to eliminate any possible leakage paths for pressurized fluid between inlet ports 72 along the surface of plate 173. That is, there is no direct leakage path existing between adjacent inlet ports 72 along the surface of plate 173, the presence of the various vent channels precluding the existence of such leakage paths. As a result, any fluid which is not accommodated by a desired inlet port 72 will flow along the surface of plate 173 to an adjacent vent channel; "cross-talk" is thus substantially eliminated.

It should be noted that while the embodiments described above are intended to greatly simplify code conversion of manually initiated fluid input signals, the scope of this invention is not intended to be limited thereto since the principles of code conversion apply equally well to automatic or semi-automatic signal initiation. Thus motor driven members such as dial member 14 can have their positions varied in accordance with some predetermined parameter and appropriately coded fluid signals may be generated at the coding circuit assembly.

While the embodiment described above comprises conversion from decimal to BCD codes, it is to be understood that this is not to be construed as limiting and that this disclosure will make conversions between other types of codes apparent to those skilled in the art. As an example of the diversity available in this regard, the position of members such as dial member 14 may be converted to a Morse code so as to provide an alphabet or similar output in coded form. It is also to be understood that various design expedients, such as fluid sealing means, washers, etc. are to be contemplated as being employed in the embodiment described as necessary. Further, in the first described embodiment, the lateral positions of the individual elements in each converter section are to be understood as fixed relative to the shaft 6 by means of such expedients as spring clips fitted into appropriately located channels in the shaft. An example of this is spring clip 48 in FIGURE 4, utilized to prevent plate 17 from moving laterally towards the adjacent end of shaft 6. It is further to be understood that the description of five individual converter sections (above) is arbitrary and that any number of such sections may be employed, depending upon the requirements of the particular application. It will also be evident to those skilled in the art that a suction force from a vacuum source may be employed in place of pressurized fluid.

While I have described and illustrated a number of specific embodiments of my invention, it will be clear that variation of the details of construction which are specifically illustrated and described may be resorted to without departing from the spirit and scope of the invention.

I claim:
1. A position controlled device for providing coded fluid command signals comprising:
   a fluid logic circuit having a plurality of fluid inlet ports disposed in radial patterns extending from a predetermined axis for receiving pressurized fluid, a plurality of fluid outlet ports, each for providing a different unit of a coded fluid signal, and fluid passage means for connecting predetermined combinations of said inlet ports to said outlet ports in accordance with a specified code;
   means for supplying a fluid pressure at selectable ones of said fluid inlet ports, said means being rotatable about said axis and relative to said fluid inlet ports so as to be selectively aligned with different ones of said radial patterns of said fluid inlet ports.
2. A position controlled device for providing coded fluid command signals comprising;
   a fluid logic circuit having a plurality of fluid inlet ports for receiving pressurized fluid, a plurality of fluid outlet ports, each for providing a different unit of a coded fluid signal, and fluid passage means for connecting predetermined combinations of said inlet ports to said outlet ports in accordance with a specified code;
   means for supplying a fluid pressure at selectable ones of said fluid inlet ports, said means being movable relative to said fluid inlet ports so as to be selectively aligned with different ones of said fluid inlet ports;
   said means for supplying a fluid pressure comprising:
   a shaft having a radially extending fluid port and a substantially longitudinal fluid passage communicating with said radially extending port formed therein;
   a source of pressurized fluid connecting to said longitudinal fluid passage;
   a control member rotatably mounted on said shaft about said radially extending port having fluid conducting means and fluid supply ports formed therein, said fluid conducting means providing a fluid conduction path between said radially extending port and said supply ports, said supply ports being positioned on said member to be selectively aligned with different ones of said inlet ports.
3. The device of claim 2 wherein said fluid logic circuit is fixedly mounted on said shaft adjacent said control member.
4. The device of claim 3 further comprising indicator means for displaying an indication of the relative position between said supply ports and said inlet ports.
5. The device of claim 4 wherein said indicator means comprises individual markings on respective individual circumferentially disposed edge surfaces of said control member.
6. The device of claim 5 further including position locking means for holding said control member in predetermined rotational positions about said shaft, said predetermined rotational positions being determined by the alignment of said supply ports with respective ones of said fluid inlet ports of said logic circuit.
7. The device of claim 6 wherein said position locking means comprises:
   a detent member fixedly mounted about said shaft and having a plurality of holes formed therein, said holes forming a circular path about said shaft and being spaced to correspond to the spacing between said predetermined positions of said control member;
   compressible means extending from said control member for engaging a different one of said plurality of holes in said detent member for each position of said control member.

8. The device of claim 6 wherein said control member is adapted to be movable by hand and includes a disk member having a plurality of regularly disposed edge surfaces corresponding to the number of positions of said control member, a thumbwheel member in the shape of a disk having radially extending tooth-like projections and recessed edge surfaces between said projections, and means for securing said disk member and thumbwheel such that rotation of said thumbwheel member about said shaft produces a corresponding rotation of said disk member.

9. The device of claim 8 wherein said tooth-like projections are equally spaced and said recessed edge surfaces are aligned adjacent respective edge surfaces of said disk member.

10. The device of claim 8 wherein said supply ports are disposed at different radial distances from said shaft along said control member, and wherein said inlet ports of said logic circuit are arranged in circular paths about said shaft, said circular paths having radii which correspond to the said radial distances of respective supply ports.

11. The device of claim 10 wherein said fluid logic circuit provides a binary coded output signal and said disk member has ten of said edge surfaces, each surface marked with a different respective decimal unit.

12. A position controlled device for providing coded fluid command signals comprising:
  a fluid logic circuit having a plurality of fluid inlet ports for receiving pressurized fluid, a plurality of fluid outlet ports, each for providing a different unit of a coded fluid signal, and fluid passage means for connecting predetermined combinations of said inlet ports to said outlet ports in accordance with a specified code;
  means for supplying a fluid pressure at selectable ones of said fluid inlet ports, said means being movable relative to said fluid inlet ports so as to be selectively aligned with different ones of said fluid inlet ports; said means for supplying a fluid pressure comprising:
    a source of fluid under pressure;
    a shaft;
    means for mounting said fluid logic circuit in fixed relation with respect to said shaft;
    a control member rotatably mounted on said shaft, said control member having a fluid conducting channel in fluid communication with various ones of said inlet ports as a function of the rotational position of said control member;
    means for connecting said source to said fluid conducting channel.

13. The device of claim 12 wherein said means for connecting comprises a fluid supply passage formed in said fluid logic circuit and communicating with said source and said fluid conducting channel.

14. The device of claim 13 further comprising indicator means for displaying an indication of the rotational position of said control member.

15. A fluid signal encoder comprising:
  a single selectively movable member for providing pressurized fluid to at least three selectable locations;
  fluid circuit means for receiving said pressurized fluid at said selectable locations and for converting said pressurized fluid into coded fluid signals representative of the location at which said pressurized fluid is received;
  indicator means for displaying an indication representing the location at which said pressurized fluid is received, said indication being in a numerical code which is different from the code of said fluid signals.

16. The encoder of claim 15 wherein the code of said indication is a decimal code and the code of said signals is a binary type code.

17. The encoder of claim 16 wherein said means for providing pressurized fluid and said fluid circuit means are movable with respect to each other.

18. A fluid signal encoder comprising:
  selectively movable means for providing pressurized fluid at a plurality of selectable locations;
  fluid circuit means for receiving said pressurized fluid at said selectable locations and for converting said pressurized fluid into coded fluid signals representative of the location at which said pressurized fluid is received;
  indicator means for displaying an indication representing the location at which said pressurized fluid is received, said indication being in a numerical code which is different from the code of said fluid signals; wherein said means for providing pressurized fluid and said fluid circuit means are movable with respect to each other; and
  wherein said means for providing pressurized fluid comprises:
    a source of pressurized fluid;
    a shaft;
    a member rotatably mounted on said shaft having fluid conducting means formed therein in fluid communication with said source, the position of said fluid conducting means determining the location at which said fluid circuit means receives pressurized fluid.

19. The encoder of claim 18 wherein said fluid circuit means comprises:
  a plate fixedly mounted on said shaft adjacent said member;
  a plurality of fluid inlet ports formed in said plate for receiving the pressurized fluid at said plurality of selectable locations, said inlet ports being positioned such that different combinations thereof receive fluid from said fluid conducting means for respective positions of said member;
  a plurality of outlet ports for providing said coded fluid signals; and
  fluid channel means for interconnecting predetermined ones of said inlet ports to predetermined ones of said outlet ports in accordance with the code employed for said coded fluid signals.

20. The encoder of claim 19 wherein said fluid conducting means comprises a channel extending radially from said shaft and in continuous fluid communication with fluid circuit means, and wherein said inlet ports are arranged in a plurality of paths extending radially from said shaft, the member of said paths being equal to the number of discrete positions attainable by said member.

21. The encoder of claim 20 wherein a plurality of vent channels are provided in the surface of said plate which is adjacent said member, said vent channels being positioned adjacent said inlet ports such that fluid leakage paths along said surface are substantially eliminated.

References Cited

UNITED STATES PATENTS 3,311,300   3/1967   Caldwell et al.    235—201
3,312,238   4/1967   Voit    235—201

RICHARD B. WILKINSON, *Primary Examiner.*

LAWRENCE R. FRANKLIN, *Assistant Examiner.*

U.S. Cl. X.R.

235—61